United States Patent [19]
Hamelink

[11] 4,027,172
[45] May 31, 9177

[54] RESISTIVE FLUID DETECTING MEANS

[75] Inventor: William B. Hamelink, Richfield, Minn.

[73] Assignee: Honeywell Inc., Minneapolis, Minn.

[22] Filed: Oct. 2, 1975

[21] Appl. No.: 618,857

[52] U.S. Cl. .............................. 307/118; 73/304 R; 137/392; 340/244 R
[51] Int. Cl.² ......................................... G01F 23/00
[58] Field of Search ......... 307/118, 116; 73/304 R, 73/290 R, 308, 304 C; 137/392, 424, 386, 387; 340/244 R, 244 C; 317/DIG. 3

[56] References Cited
UNITED STATES PATENTS 3,119,266  1/1964  Atkinson ......................... 73/304 R Primary Examiner—Herman J. Hohauser
Attorney, Agent, or Firm—Alfred N. Feldman

[57] ABSTRACT

A resistive fluid detecting means utilizes a probe means having three electrically conductive areas that are interconnected between a power source and an amplifier. The detecting means is particularly useful in detecting the presence or absence of water in a boiler used in a heating plant. The presence of water between two of the electrically conductive areas reduces the resistance of that path so that the amplifier responds and operates an output switch, which in turn can be used to energize a fuel burner for the boiler. If boiler scale builds up on the probe means or if the water or fluid rises too high, the electrically conductive areas shunt current away from the amplifier and allow the output switch to open.

17 Claims, 8 Drawing Figures

RESISTIVE FLUID DETECTING MEANS

Resistive fluid detecting means in the form of probes to sense the presence or absence of boiler water in heating plant boilers has been known for many years. This type of probe normally relies on the establishment of a single conductive circuit between a probe and the boiler, or two elements or areas of a single probe. The resistance measurement is then converted into a decision as to whether or not boiler water is present. This type of probe requires a large amount of maintenance in order to make sure that boiler water scale, which tends to build up on the probe, is not shorting the probe out and falsely simulating the presence of the resistive fluid or boiler water.

Boiler water can vary widely in its mineral content and, therefore, vary over a wide range of resistivities. Water which is relatively free of mineral deposits has a relatively high resistance and is more desirable in boiler applications as there is less boiler scale generated or deposited by the use of the pure form of water. In many boilers, the water contains a substantial amount of minerals due to the local water conditions, and this type of water has a tendency to build up a scale across the probe element thereby simulating the prensence of water. Normal boiler water probes may require regular maintenance to clean the boiler scale from the probe or require a probe design that physically tends to expand and contract to tend to be self-cleaning. The use of a boiler probe using a single resistive circuit for measuring the presence or absence of boiler water is relatively inexpensive, but is also less reliable than would be desirable in most boiler installations.

Boiler water sensing mechanisms also have been developed which use floats to sense the level of boiler water and mechanically operate switches. This type of mechanism also is subject to corrosion and boiler water scale contamination in the mechanism of the float, thereby creating a sensing mechanism which also may be less than desirable in reliability.

SUMMARY OF THE INVENTION

The present invention is a resistive fluid detecting means that is unique in that it utilizes a probe means having three electrically conducted areas that are normally electrically insulated from each other for measuring the resistance of the detected fluid. In order to simplify the discussion of the present application, the resistive fluid will be more specifically referred to as boiler water. The fluid could be any type of fluid which has an electrical resistance to the flow of current, and the sizing of the electrically conductive areas of the probe means and the type of amplifier used with the system can adjust the system for the detection of almost any type of fluid which has a resistance to the flow of electrical current therethrough.

In the present invention, the three element or conductive area probe means is mounted into a container with a resistive fluid. Typically this would be the mounting of a sensing probe through the wall of a boiler in a heating plant, and the fluid would be water containing the normal minerals present in most boiler water or boiler plant installations. The use of a probe means having three electrically conductive areas allows for the establishment of three separate and distinct resistance paths through the boiler water. One of the paths would be the conventional path from the probe through the boiler water. This resistive path, if completed, creates an electric circuit which activates an amplifier to close an output switch means and that in turn would allow for the energization of the fuel burner for the boiler.

In the event that boiler water scale built up between the area of the probe exposed to the boiler water and a conductive area that will be referred to as a guard ring, the resistance of the boiler water scale would create a resistance path that would shunt the current normally supplied to the input of the amplifier means thereby causing the amplifier means to be de-energized and to drop out the output switch. This same type of operation could occur when the water level in the boiler exceeds a predetermined depth in which the conductive area referred to as the guard ring would be shorted out to the third of the conductive areas which, might be the wall of the boiler itself. This third path, if it is established for the carrying of electric current, also acts as a shunt to shunt out the energizing current for the amplifier means and thereby de-activates the amplifier and drops out the output switch means preventing the energization of the burner associated with the boiler.

It thus becomes apparent that the present resistive fluid detecting means can sense the proper level of boiler water in a boiler and allow the output switch means to energize a burner, or can de-activate the output switch means if boiler scale shorts out the probe or if the fluid level rises to an unsafe level. The present resistive fluid detecting means or boiler water probe therefore is inherently fail safe in its operation.

DESCRIPTION OF THE PREFERRED EMBODIMENT

Figure 1:
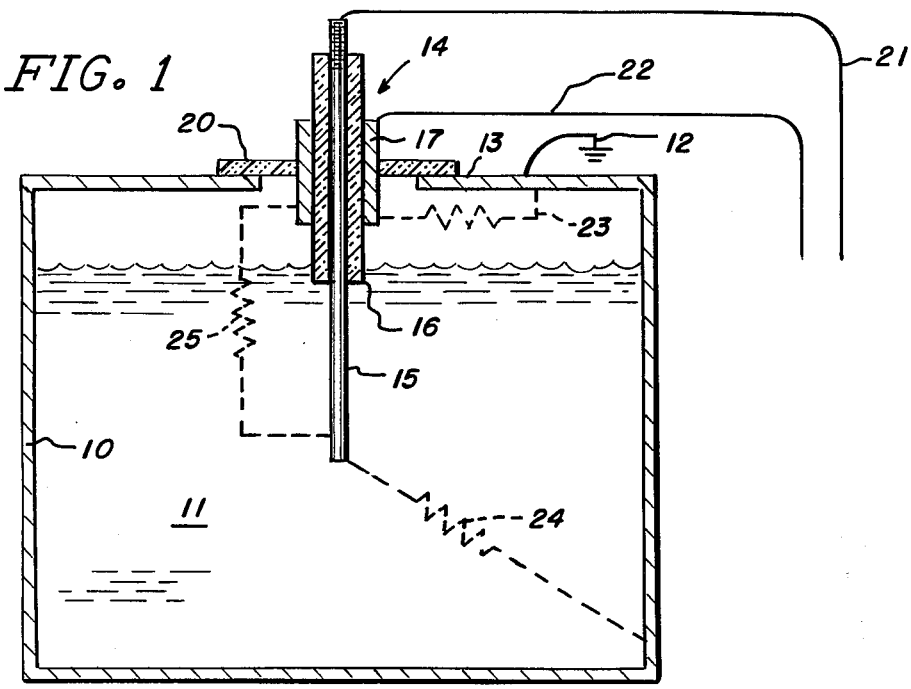
FIG. 1 is a representation of a resistive fluid containing device, such as a heating plant boiler, with the novel probe means mounted therein.
Figure 2:
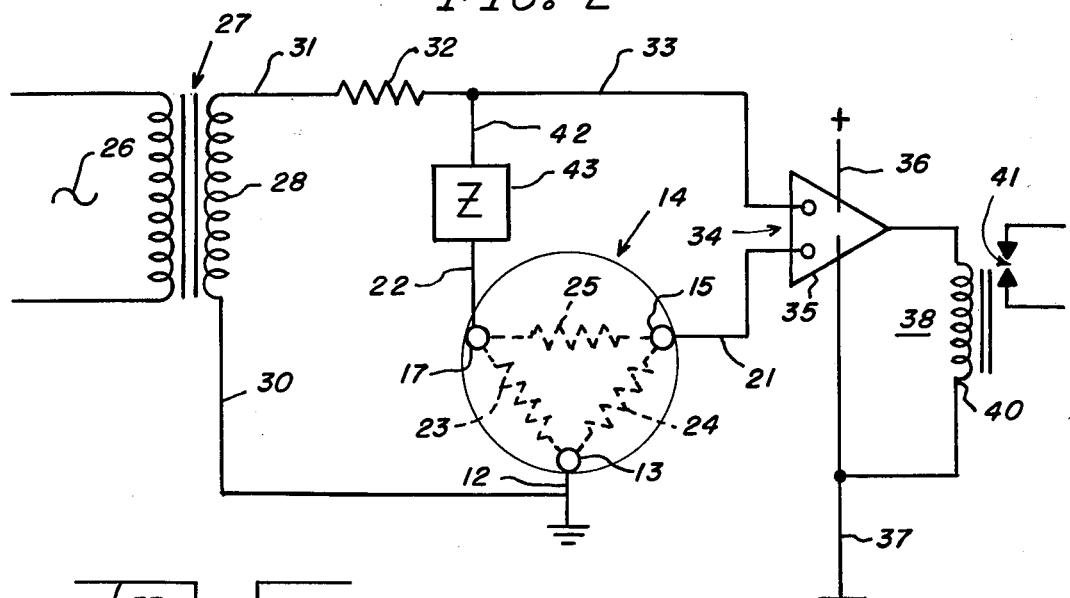
FIG. 2 is an electric schematic diagram of a resistive fluid detecting means utilizing the probe means of FIG. 1.

In FIG. 1 the resistive fluid detecting means is disclosed along with the electric schematic of the system in FIG. 2 so that the theory of the operation of the present invention can be explained.

In FIG. 1 a container 10 is disclosed and is any type of fluid tight type of container. In the present invention reference will generally be made to container 10 as being a boiler of a heating plant. Container 10 is partially filled with a resistive fluid 11, which normally would be water containing normal mineral contents associated with the boiler of a heating plant. The resistive fluid 11 can be any fluid through which electric current will pass and which has a minimal resistance value. In FIG. 1, the container 10 is disclosed as a metallic container or boiler having an electrical ground connection 12 and forms part of the electrical circuit disclosed in FIG. 2.

Inserted into the top 13 of the container 10, is a probe means generally disclosed at 14. In this particular embodiment, probe means 14 includes the container 10 as one of three electrically conducted areas which partially make up the probe means 14. The probe means 14 contains an electrically conductive center electrode 15 which has an exposed surface area that forms one of the three electrically conductive areas of the probe means 14. Encircling the electrode 15 is an insulating sleeve 16 which, in turn, is encircled by a conductive ring 17 that forms the third electrically conductive area and which will be referred to as the guard ring of the present invention. The electrically conductive ring 17 is mounted in an insulating member 20 that in turn mounts on the top 13 of the container 10. It thus becomes apparent that the probe means 14 has three electrically conductive areas 15, 17 and 13, which are each electrically insulated form one another. A conductor 21 is connected to the electrode 15 while a conductor 22 is connected to the guard ring 17 for connection into an electric circuit of the type disclosed in FIG. 2.

Three resistive paths that are possible with the combination of electrically conductive areas have been shown in phantom in the figures and are indicated at 23, 24 and 25. The resistance 23 would be between the guard ring 17 and the top 13 of the container 10. The resistance 24 would be between the center electrode or conductive area 15 and the container 10 through the fluid 11 in the container 10. The third resistance path 25 would be between the element 15 and the guard ring 17 through the fluid 10, any air in the container, and through any possible mineral build up that might occur between the electrode or conductive area 15 and the guard ring 17.

In FIG. 2 a complete resistive fluid detecting means or system incorporating the probe means 14 is disclosed. A conventional source of alternating current 26 is applied to a transformer 27 having a winding 28 to supply alternating current potential. The present invention will work with either an alternating current potential or a direct current potential, but the preferred embodiment is the use of an alternating current potential to avoid the possibility of the electrically conductive areas becoming electro-plated or effected by any type of polarizing action. The winding 28 has a conductor 30 which connects one side of the winding to the electrically conductive area 13 or ground 12 for the system. The other side of the transformer winding 28 is connected by conductor 31 through a dropping resistor 32 to a conductor 33 that is connected to the input means 34 of an amplifier means 35. The amplifier means 35 is connected to any conventional source of direct current potential at 36 and 37. The amplifier means 35 in this particular embodiment is a current responsive amplifier which is activated by a current flow through the input means 34 of the amplifier means 35. The amplifier means 35 has an output switch means 38 disclosed as a relay coil 40 and a pair of normally open relay contacts 41.

The input circuit means 34 for the amplifier means 35 is connected also to conductor 21 to the central electrically conductive area 15 of the probe means 14. The electric circuit is completed by a conductor 42 that connects to an impedance 43 to the conductor 22 that is connected to the electrically conductive area or guard ring 17. The impedance 43 is selected to match the impedance of the input circuit means 34 of the amplifier means 35, and if the amplifier means 35 is a current amplifier, the impedance 43 can in fact be dispensed with and can be a plain conductor. If the amplifier means 35 were a voltage type of amplifier, a compensating impedance 43 would be desirable to make the present system operable.

The operation of this system disclosed in FIG. 2 can best be understood by considering the normal situation first and then the abnormal or unsafe situations against which the system would protect. If the system were energized and no water or resistive fluid 11 were present in container 10, all of the resistances 23, 24 and 25 would be substantially infinite. In that case no current would flow in the input circuit means 34 of the amplifier means 35. The output switch means 38 would be de-energized and the contacts 41 would be open thereby keeping "off" the burner which would be used with a boiler in a heating plant which the container 10 represents.

Water is introduced into the boiler 10 until the fluid level disclosed in FIG. 1 is obtained, which is substantially the normal condition wherein water reaches the electrically conductive area or electrode 15 but does not reach the guard ring conductive area 17. In that case, the resistance of the resistor 24 through the resistive fluid 11 would be relatively low and a current carrying path would be established between the conductors 21 and 12. This would cause a current to flow through the input circuit means 34 of amplifier means 35 thereby energizing the relay 40 and closing the contacts 41. This would allow the energization of the burner in a normal manner.

If the abnormal condition occurred wherein boiler scale built up between the conductive area 15 and the guard ring 17, or between the guard ring 17 and the conductive area 13, the resistances 23 and 25 would decrease from their substantially infinite values. If resistor 23 or resistor 25 or both of these resistors decreases in value significantly due to any type of build up or unsafe condition, these resistance paths from a shunt to divert current from the input means 34 of amplifier means 35. In either of these cases, the diversion of the current or the shunting of the current causes the amplifier means 35 to drop out relay 40 to open the contacts 41.

Taking the resistive path 25 first, if resistive path 25 comes relatively low, current will flow in conductor 22, through the resistance path 25 and through the resistance path 24 through the water or resistive fluid 11 in the system. This flow of current would divert a sufficient amount of current from the input circuit means 34 and the amplifier means 35 to de-energize the amplifier means 35. If the value of resistance 23 decreases in value, it is obvious that there is even a more direct shunt between the conductor 22 and the conductor 12 thereby shorting out the input circuit means 34 of amplifier means 35 thereby dropping out the relay 40. This can readily occur if the boiler or container 10 is over-filled with water thereby allowing the present system to not only detect the presence of a resistive fluid, the build up of any undesired scale or undesired resistance paths, but it is also capable of detecting when the container 10 is filled to an unsafe or full level.

The schematic disclosures of FIGS. 1 and 2 establish the operating principles upon which the present invention is based. More practical configurations of both the probe means and the amplifier arrangement are disclosed in the balance of the figures and similar numbers will be used to indicate similar elements.

Figure 2A:
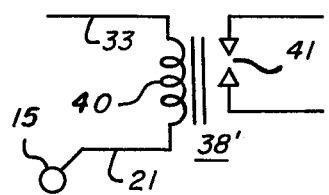
FIG. 2a is a modified form of FIG. 2.

In FIG. 2a the amplifier means 35 of FIG. 2 is replaced by a relay means 38' which acts directly from the current flow in the relay means 38'. In this case impedance 43 is selected to operate with the impedance of relay means 38'.

Figure 3:
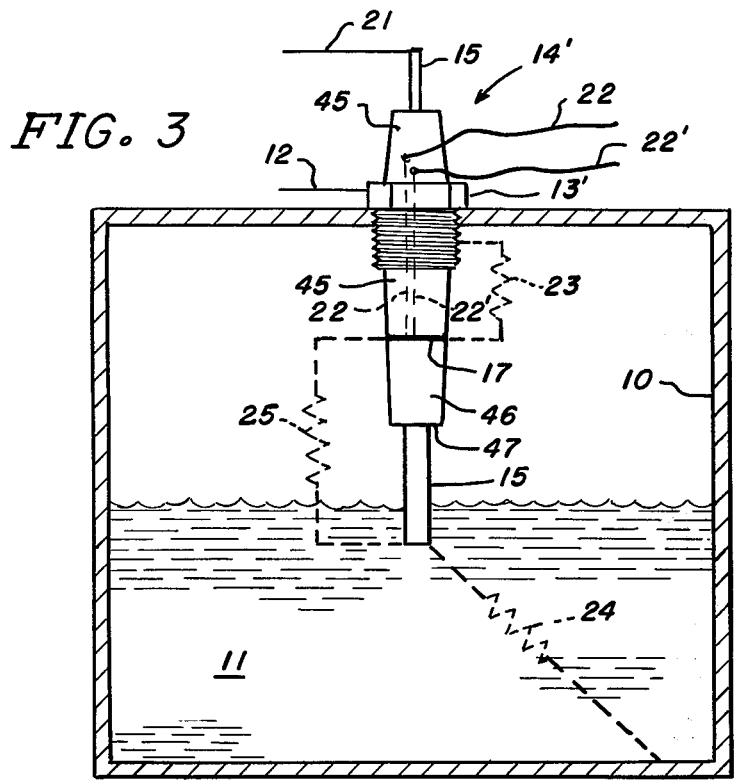
FIG. 3 is an improved probe configuration in a boiler similar to that of FIG. 1, but wherein the probe has one of its conductive areas connected by a pair of conductors to the electric circuit.

In FIG. 3, a boiler or container 10 is again disclosed with a resistive fluid or water 11 filling part of the container 10. A modified probe means 14' is disclosed which has three electrically conductive areas in the form of a threaded nut 13', an electrode 15, and a guard ring 17. The electrode 15 is connected to conductor 21 while the member 13' is connected to conductor 12. The guard ring 17 is connected to a conductor 22 and by a second parallel but separate conductor 22'. The conductors 22 and 22' are used as redundant features for a safety function that will be described in connection with FIG. 4. The conductive area 13' is manufactured in the form of a hex-head nut with a threaded portion to be threaded into the container 10 in a fluid tight manner as well as being connected to the conductor 12. Passing through the center of the member 13' is an insulator 45 and in its upper portion there is an entry for the conductors 22 and 22', as well as having a central opening for the electrodes 15. The insulator 45 passes through the member 13' and abuts against the guard ring 17 where the conductors 22 and 22' are connected to the guard ring 17. A further insulating member 46 is provided between the bottom of the guard ring 17 and a sealed end 47. At the end 47, the electrode 15 again protrudes to make up a unitary probe means 14' that functions in exactly the same manner with the resistors 22, 23 and 24 in FIG. 2. A practical application of an amplifier circuit for use with the probe means 14' is disclosed in FIG. 4.

Figure 4:
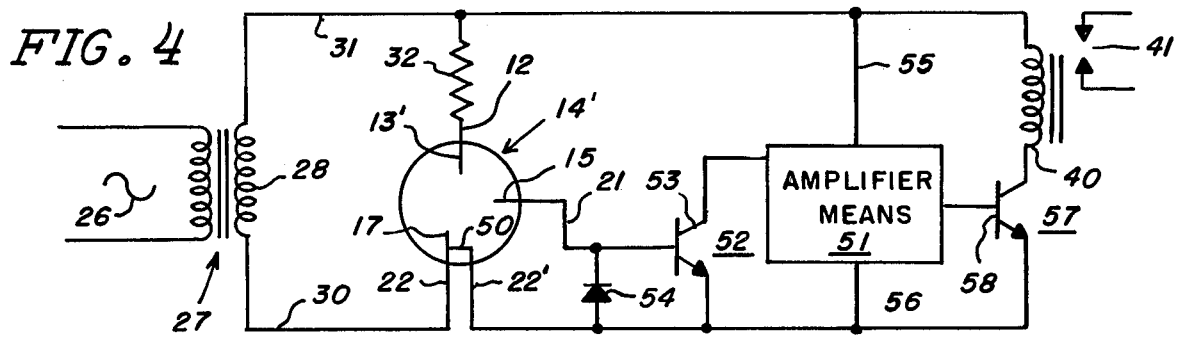
FIG. 4 is an electric schematic of a resistive fluid detecting means or system utilizing a probe of the type disclosed in FIG. 3.

In FIG. 4 the source of energizing potential 26, transformer 27 and secondary 28 along with the conductors 31 are 30 are again disclosed. In this particular case the conductor 31 passes through a limiting resistor 32 to conductor 12 of the probe means 14'. Probe means 14' again has the conductive area 15 and the guard ring 17. The guard ring 17 is shown as being connected internally of the probe means 14' at 50 between the conductors 22 and 22'.

Connected between the conductor 31 and the conductor 22' is an amplifier means 51 that has an input circuit means 52 including a transistor 53 that has a diode 54 for limiting the signal between the conductors 21 from the conductive area 15 and the conductor 22'. The amplifier means 51 is connected by conductors 55 and 56 to conductors 31 and 22' to receive power and has an output switch means generally disclosed at 57 including a transistor 58 and the relay 40 along with a pair of normally open contacts 41.

The operation of the devices disclosed in FIGS. 3 and 4 is substantially the same as that of FIGS. 1 and 2. When a potential is supplied between conductors 30 and 31, the potential is carried on through the guard ring connection 50 so that the amplifier means 51 is energized between the conductors 31 and 22'. If no resistive fluid or water is present, no resistive circuit is made in the probe means 14' and the amplifier means 51 has no drive signal in the transistor 53 to energize the output means or relay 40. Upon the presence of a resistive fluid or water 11 at the probe means 14', a resistive circuit is developed between the conductive area 13' and 15. This resistive circuit allows current to be drawn through the transistor 53 to cause amplifier 51 to pull in the relay 40 to close contacts 41 to energize a burner for the boiler for which this system is particularly adapted.

In the event that water fills the container 10 or if boiler scale causes any type of build up to bridge between the conductive areas 13' and 17, or 15 and 17, the input to the amplifier means 51 is shunted so that the amplifier means 51 cannot pull in the relay 40.

While the device of FIGS. 3 and 4 operate in the same general manner as that described in connection with FIGS. 1 and 2 an improved safety feature has been added by using the conductors 22 and 22' which are connected at 50 within the probe means 14'. In the event that either of the leads which should be connected to the electrically conductive area or guard ring 17 are either accidently not connected, or are broken in the installation or use of the system, the power from conductor 30 and transformer secondary 28 is removed from the amplifier means and the system fails in a manner wherein the relay 40 is de-energized and the contacts 41 are open. Once again, this type of failure is considered to be a safe failure in that it prevents the burner from being energized that is associated with the boiler in which the present invention is particularly adapted to be used. The double wire configuration in connection with the guard ring 17 adds one further step of safety that has not been previously available in any type of water sensing probe.

Figure 5:
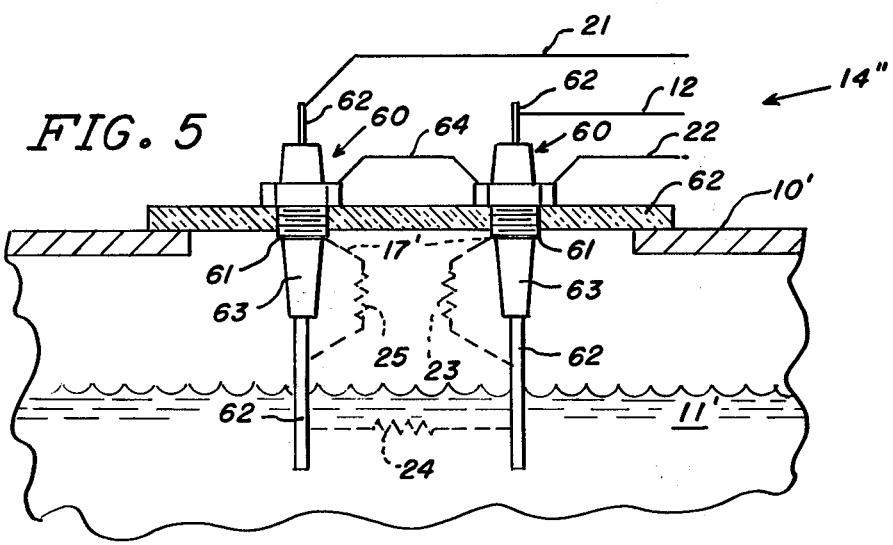
FIG. 5 is a schematic representation of a pair of two-element electric probes connected together to form the three conductive areas of a probe of the present invention.

In FIG. 5, a dual probe configuration (wherein two identical probes 60 are disclosed) can be used in a tank or container 10'. The probes 60 are each mounted by threaded portions 61 into an insulating section 62 of the tank 10' wherein the tank 10' can be either a conductive or a nonconductive type tank. This might be a case wherein a fluid other than boiler water is involved. The disclosure of FIG. 5 might be applied to the sensing of fuel oil or some other type of material in a tank is being filled or used in some type of process control.

The electrodes 60 each have a central conductive element 62 which passes through an insulating member 63 that in turn passes through the threaded portion 61. The probe members 60 disclosed in FIG. 5 are very similar to the probes currently used in conventional boiler water sensing where only a single resistive path is used. A resistive fluid 11' is disclosed as appearing across the conductive area 62 and provides for the resistance 24 of the previously disclosed system. A jumper 64 is provided to electrically connect the portions 61 each of the probes 60 together thereby providing three electrically conductive areas with each of the areas normally electrically insulated from one another by the interconnection of two identical probes of conventional design. A conductor 21 is connected to one of the probe elements 62 while the conductor 12 is connected to the other of the conductive elements 62 of probe 60. The jumper connector 64 is further extended to be connected to the conductor 22 and thereby makes the elements 61 of the two probes 60 the guard ring elements 17' for each of these units. Once again, the resistors 25 and 23 would occur between the conductive areas 62 and the guard ring elements 17'.

It should be noted that the two identical probes 60, by the use of the jumper 64, provide all of the elements of the probe means 14 and 14'. These elements are three electrically conductive areas with each of the areas normally electrically insulated from the other of the areas.

Figure 6:
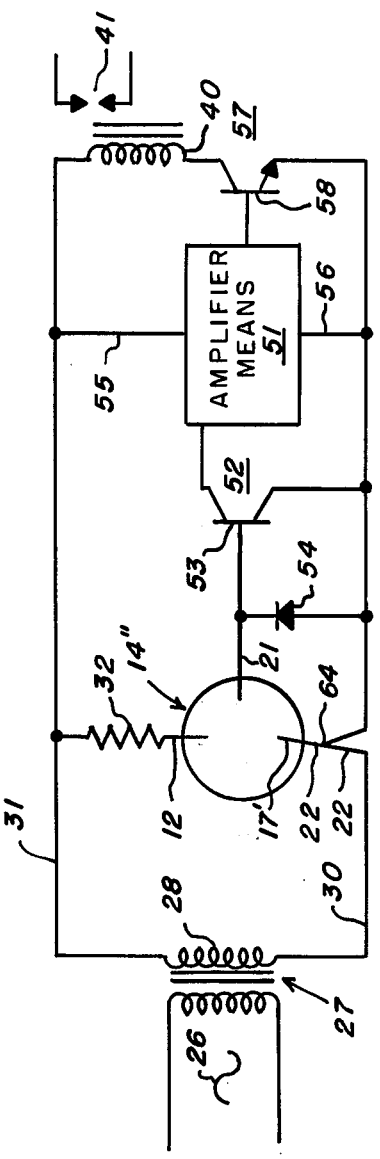
FIG. 6 is an electric schematic of a system utilizing the probe structure of FIG. 5.

In FIG. 6, a circuit diagram substantially the same as that of FIG. 4 is disclosed with the exception that the guard ring connection 64 is shown external to the probe means 14''. The external jumper 64 in this case replaces the internal jumper 50 of FIG. 4. The balance of the circuit of FIG. 6 is the same as that of FIG. 4 and will not be described in detail. The operation still remains the same, that is, the presence of a resistive fluid between the conductive areas 62 connected to conductors 12 and 21 will cause the input circuit to the amplifier means 51 to be operated to close the relay contacts 41. The development of a resistance path between the conductors 17' and 12 between 17' and 21 cause shunt paths through the probe means 14'' thereby causing the amplifier to be non-operative.

Figure 7:
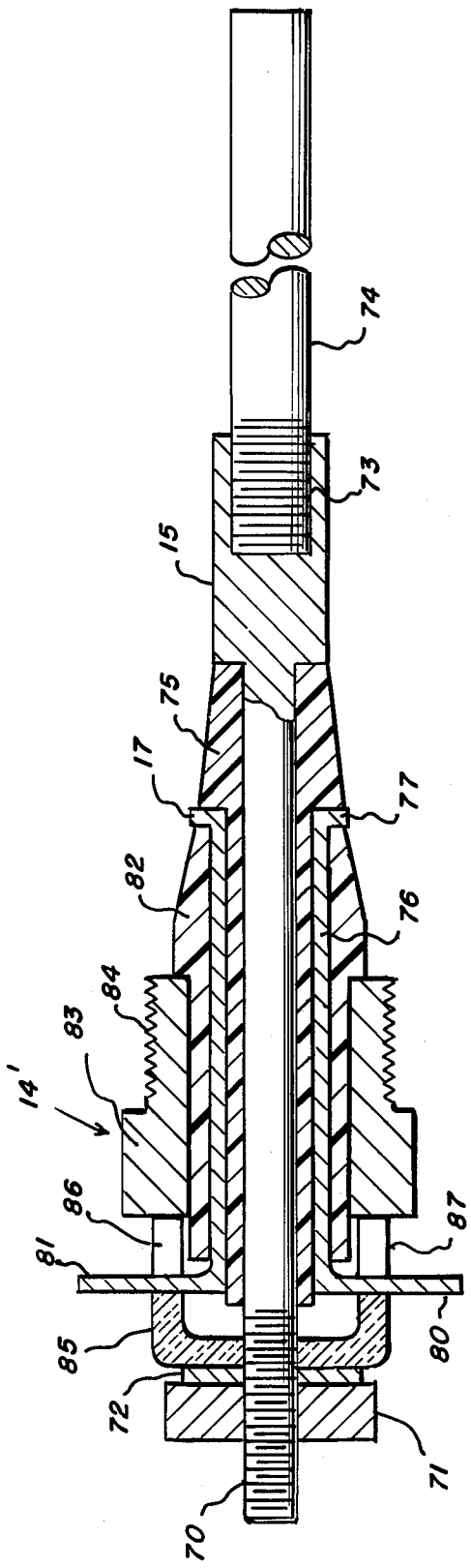
FIG. 7 is a cross-section of a practical embodiment of a probe element which was schematically disclosed in FIGS. 1 and 3.

FIG. 7 details a probe means of the type disclosed in FIG. 3 in a practical, production form. The probe means 14' is disclosed having the central conductive area or element 15 which passes through the device to a threaded section 70 and a conventional nut 71 along with a conventional washer 72. A threaded opening 73 is provided in the element 15 so that a rod 74 can be threaded into the opening and the rod can be of any desired length depending on the particular application to which the probe is put. The conductive area 15 is surrounded by an insulator 75 and can be manufactured from a soft material such as Teflon in order to obtain the necessary fluid seal. A tube like member 76 is provided with a flared end 77 that forms the guard ring 17 of the probe means 14'. The tube 76 is split at its upper end to form two projections 80 and 81. The projections 80 and 81 correspond to the dual connections 22 and 22' of FIG. 3.

Surrounding the tube 76 is a further insulating member 82, again a soft material such as Teflon so that a fluid seal is readily attained. A hex type nut 83 including a tapered threaded portion 84 is provided with pipe threads for convenient threading of the present probe means 14' into a container 10. The structure is completed by the addition of an insulating clamp 85 having two slots 86 and 87 that pass over the ears or projections 81 and 80 to protect against accidental shorts when the circuit disclosed in FIG. 4 is connected to the probe 14'.

It becomes obvious from the various configurations specifically disclosed in the present application that the present invention is capable of being carried out in many different forms. The specific structural form utilized and the specific type of resistive fluid or container, as well as the specific type of amplifier are not critical. The main concept involved is the use of three electrically conductive areas with each of the areas normally electrically insulated from one another so that three separate electrical paths can be created wherein one of the paths creates a safe operation of the device, and the creation of either of the other paths causes the device to fail in an non-operative condition which is the safe condition. Because of all of the variations that are possible, the applicant wishes to be limited in the scope of his invention solely to the scope of the appended claims.

The embodiments of the invention in which an exclusive property or right is claimed are defined as follows:

1. A resistive fluid detecting means, including: probe means having three electrically conductive areas with each of said areas normally electrically insulated from the other of said areas; said probe means adapted to be mounted into a container to detect the presence of a resistive fluid within said container; electric power supply means connected to a first and a second of said electrically conductive areas and capable of establishing a first resistively conductive path through said resistive fluid; control means including output switch means; and said control means including input circuit means connected to a third of said conductive areas and capable of establishing a second and a third resistively conductive paths through said resistive fluid; said second conductive path normally being established through said resistive fluid when said fluid is present to operate said output switch means, and the establishment of either of said other conductive paths wherein an effective shunt current flows causing said output means to become non-operative.

2. A resistive fluid detecting means as described in claim 1 wherein said control means is amplifier means.

3. A resistive fluid detecting means as described in claim 2 wherein said output switch means is a relay.

4. A resistive fluid detecting means as described in claim 2 wherein said probe means is a unitary member including a threaded portion to form mounting means with said portion further being one of said electrically conductive areas.

5. A resistive fluid detecting means as described in claim 4 wherein said output switch means is a relay.

6. A resistive fluid detecting means as described in claim 4 wherein said electrically conductive areas are sized to control the resistance of said resistively conductive paths in a resistive fluid; and wherein said resistively conductive paths in said fluid are such as to cause said amplifier means to in turn cause said output switch means to be operated when said second resistively conductive path is established through said fluid.

7. A resistive fluid detecting means as described in claim 6 wherein said resistive fluid is water of a quality normally contained in a boiler used in a heating plant.

8. A resistive fluid detecting means as described in claim 7 wherein said output switch means is a relay.

9. A resistive fluid detecting means as described in claim 4 wherein said second of said electrically conductive areas is electrically connected by two conductive means to said electric power supply means in a series circuit to interrupt the operation of said detecting means in the event that either of said two conductive means is open circuited.

10. A resistive fluid detecting means as described in claim 9 wherein said electrically conductive areas are sized to control the resistance of said resistively conductive paths in a resistive fluid; and wherein said resistively conductive path in said fluid are such as to cause said amplifier means to in turn cause said output switch means to be operated when said second resistively conductive path is established through said fluid.

11. A resistive fluid detecting means as described in claim 10 wherein said resistive fluid is water of a quality normally contained in a boiler used in a heating plant.

12. A resistive fluid detecting means as described in claim 11 wherein said output switch means is a relay.

13. A resistive fluid detecting means as described in claim 2 wherein said probe means includes a portion of said container as one of said electrically conductive areas.

14. A resistive fluid detecting means as described in claim 2 wherein said probe means includes two probe elements each having two electrically conductive parts; said two probe elements being electrically connected together to form said three electrically conductive areas.

15. A resistive fluid detecting means as described in claim 14 wherein said electrically conductive areas are sized to control the resistance of said resistively conductive paths in a resistive fluid; and wherein said resistively conductive paths in said fluid are such as to cause said amplifier means to in turn cause said output switch means to be operated when said second resistively conductive path is established through said fluid.

16. A resistive fluid detecting means as described in claim 15 wherein said resistive fluid is water of a quality normally contained in a boiler used in a heating plant.

17. A resistive fluid detecting means as described in claim 16 wherein said output switch means is a relay.

* * * * *